(12) United States Patent
Houha et al.

(10) Patent No.: US 6,393,585 B1
(45) Date of Patent: May 21, 2002

(54) METHOD AND APPARATUS FOR RESTORING OPERATING SYSTEMS IN A SET-TOP BOX ENVIRONMENT

(75) Inventors: James A. Houha, Cupertino; Bill J. Aspromonte, Santa Cruz; Altan J. Stalker, San Jose, all of CA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/220,484

(22) Filed: Dec. 23, 1998

(51) Int. Cl.[7] .............................................. G06F 11/00
(52) U.S. Cl. ............................ 714/23; 713/1; 713/100; 709/221
(58) Field of Search ............................. 714/23, 24, 2, 714/7, 48.49, 48; 713/1, 2, 100; 709/220, 221, 222; 710/104, 15

(56) References Cited

U.S. PATENT DOCUMENTS

| 4,530,052 A | * | 7/1985 | King et al. ................ 364/200 |
| 5,390,103 A | * | 2/1995 | Sakakibara ................ 364/131 |
| 5,432,927 A | * | 7/1995 | Grite et al. ................ 395/575 |
| 5,481,714 A | * | 1/1996 | Pipkin et al. ............... 395/700 |
| 5,544,255 A | * | 8/1996 | Smithies et al. ............ 382/119 |
| 5,708,776 A |   | 1/1998 | Kikinis |
| 5,715,462 A |   | 2/1998 | Iwamoto et al. |
| 5,784,549 A | * | 7/1998 | Reynolds et al. ............ 714/24 |
| 5,933,647 A | * | 8/1999 | Aronberg et al. ........... 395/712 |
| 5,960,445 A | * | 9/1999 | Tamori et al. .............. 707/203 |

FOREIGN PATENT DOCUMENTS

| EP | 0 649 088 A2 | 9/1994 |
| EP | 0 803 802 A1 | 4/1997 |
| EP | 0 907 285 A1 | 10/1997 |

* cited by examiner

Primary Examiner—Thomas Lee
Assistant Examiner—Rijue Mai
(74) Attorney, Agent, or Firm—Kenneth M. Massaroni; Kelly A. Gardner; Hubert J. Barnhardt, III

(57) ABSTRACT

A computer-implemented method and apparatus for restoring operating systems within a set-top box system. The restoration provides for operating a first operating system in a first memory. An application program is operated in a second memory. The first operating system is stored in a second memory so that a second operating system is loaded into the first memory. When a predetermined condition which is associated with the second operating system is detected, the first operating system is loaded into the first memory in response to the detected predetermined condition. Such a system provides such non-limiting advantages to the set-top box as the ability to robustly recover from errors or anomalies associated with downloading an operating system.

16 Claims, 5 Drawing Sheets

METHOD AND APPARATUS FOR RESTORING OPERATING SYSTEMS IN A SET-TOP BOX ENVIRONMENT

BACKGROUND AND SUMMARY OF THE INVENTION

The present invention relates generally to set-top box computer operating systems and more particularly to computer operating system maintenance in a set-top box television environment.

Interactive digital set-top boxes provide an open platform for delivering interactive services and multimedia content to consumers across broadcast and client/server networks. Operating system software is used within the boxes to provide lower-level services to the software applications which operate within the boxes.

New versions of the operating system need to be downloaded into the set-top box so that operating system software bug fixes and greater functionality may be quickly provided to the set-top box. An exemplary non-limiting disadvantage with operating system downloads is the ability to recover from errors or anomalies associated with downloading an operating system.

One such anomaly is a power failure occurring during the download. Upon reboot after the power failure, the set-top box may malfunction due to an incomplete downloaded version of the operating system existing in the set-top box. Without an adequate operating system restoration process in place, the set-top box will continue to malfunction.

The present invention is directed to overcoming these and other disadvantages. In accordance with the teachings of the present invention, a novel method and apparatus for restoring operating systems within a set-top box system is provided. The operating system restoration method and apparatus provides for operating a first operating system in a first memory. An application program is operated in a second memory. The first operating system is stored in a second memory so that a second operating system is loaded into the first memory. When a predetermined condition which is associated with the second operating system is detected, the first operating system is loaded into the first memory in response to the detected predetermined condition.

BRIEF DESCRIPTION OF THE DRAWINGS

Additional advantages and features of the present invention will become apparent to from the subsequent description and the appended claims, taken in conjunction with the accompanying drawings in which:

DESCRIPTION OF THE PREFERRED EMBODIMENT

Figure 1:
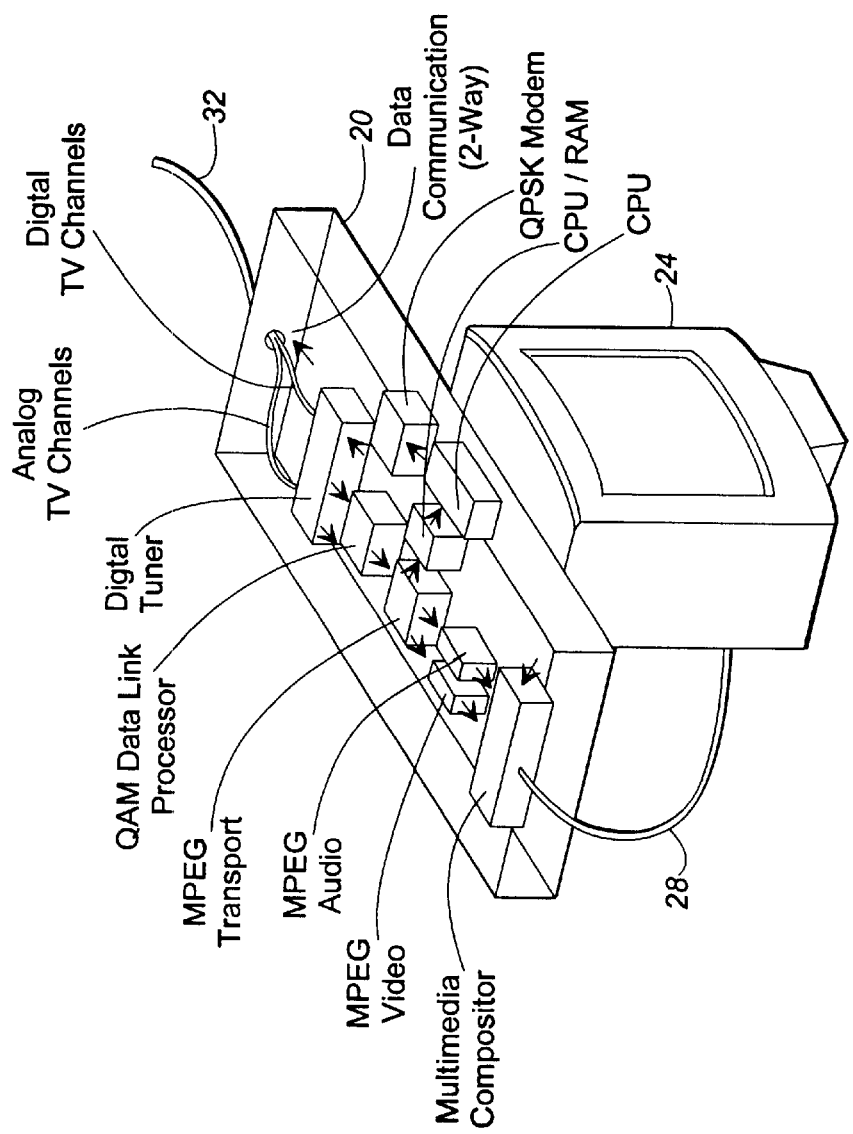
FIG. 1 is a perspective view of a set-top box system.

FIG. 1 shows an exemplary set-top box 20 connected to television 24 via cable 28. Cable 32 provides set-top box 20 with a broadcast analog, broadcast digital, and interactive digital transmission. Set-top box 20 contains application and operating system software in order to provide an advanced interactive television environment. The operating system is utilized by set-top box 20 to, for example, provide interfaces between the application software and the various devices used by the set-top box 20.

Set-top box 20 has the capability of receiving an operating system through cable 32 in order to replace the operating system that is currently functioning within set-top box 20. A new operating system may be provided, for example, through cable 32 in order to provide an operating system that contains greater functionality than the operating system currently being used in set-top box 20.

Figure 2:
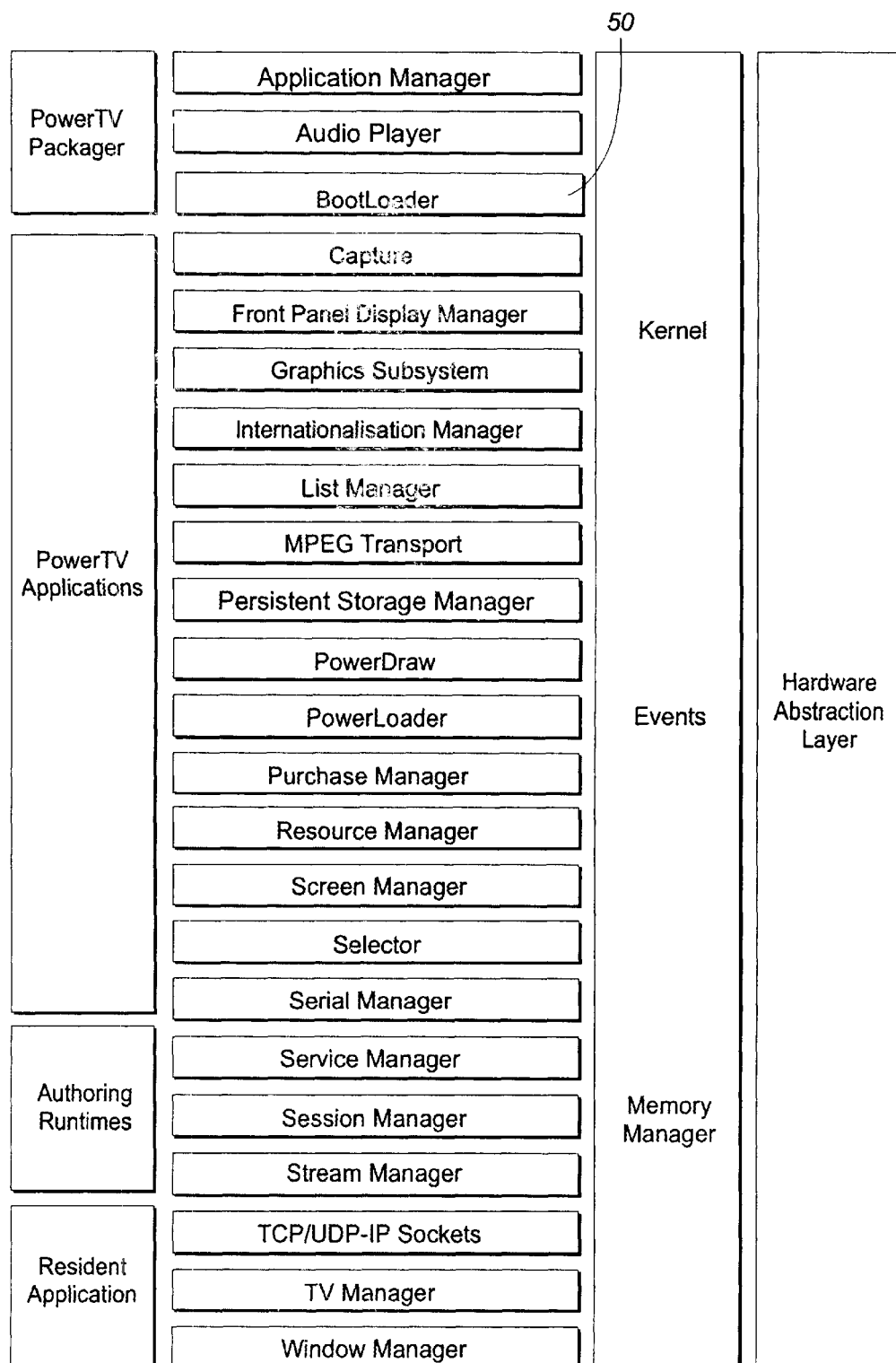
FIG. 2 is a block diagram depicting the various exemplary computer-implemented programs operating within the set-top box system of FIG. 1.

FIG. 2 shows the software application and operating system components that are used for a set-top box. Among these components, a bootloader program 50 is provided to manage the downloading of a new operating system from a remote site to a set-top box. Bootloader 50 enables a set-top box to tune to the frequency of a broadcast carousel server and identify operating system software upgrades.

If an upgrade is available, Bootloader 50 downloads the new software from the network into the set-top box's EEPROM (electromagnetic erasable programmable read-only memory) memory. Bootloader 50 also supports forced downloads under system software instruction. Within the field of the present invention, the term "forced downloads" signifies whether the dowload is to occur substantially immediately or whether to be deferred. Moreover, the download can specify that a specific version of the software is to be downloaeded. The server or box can detect that a new operating system needs to be placed on the box. Also, messages regarding a new operating system can be sent to one or many boxes.

In the preferred embodiment, the EEPROM memory of the set-top box is an eight megabyte flash memory device configured as 512 kb by 32 bit words and is preferably available from Advanced Micro Devices, Inc. (AMD) under the product number AM29F800BB.

Figure 3:
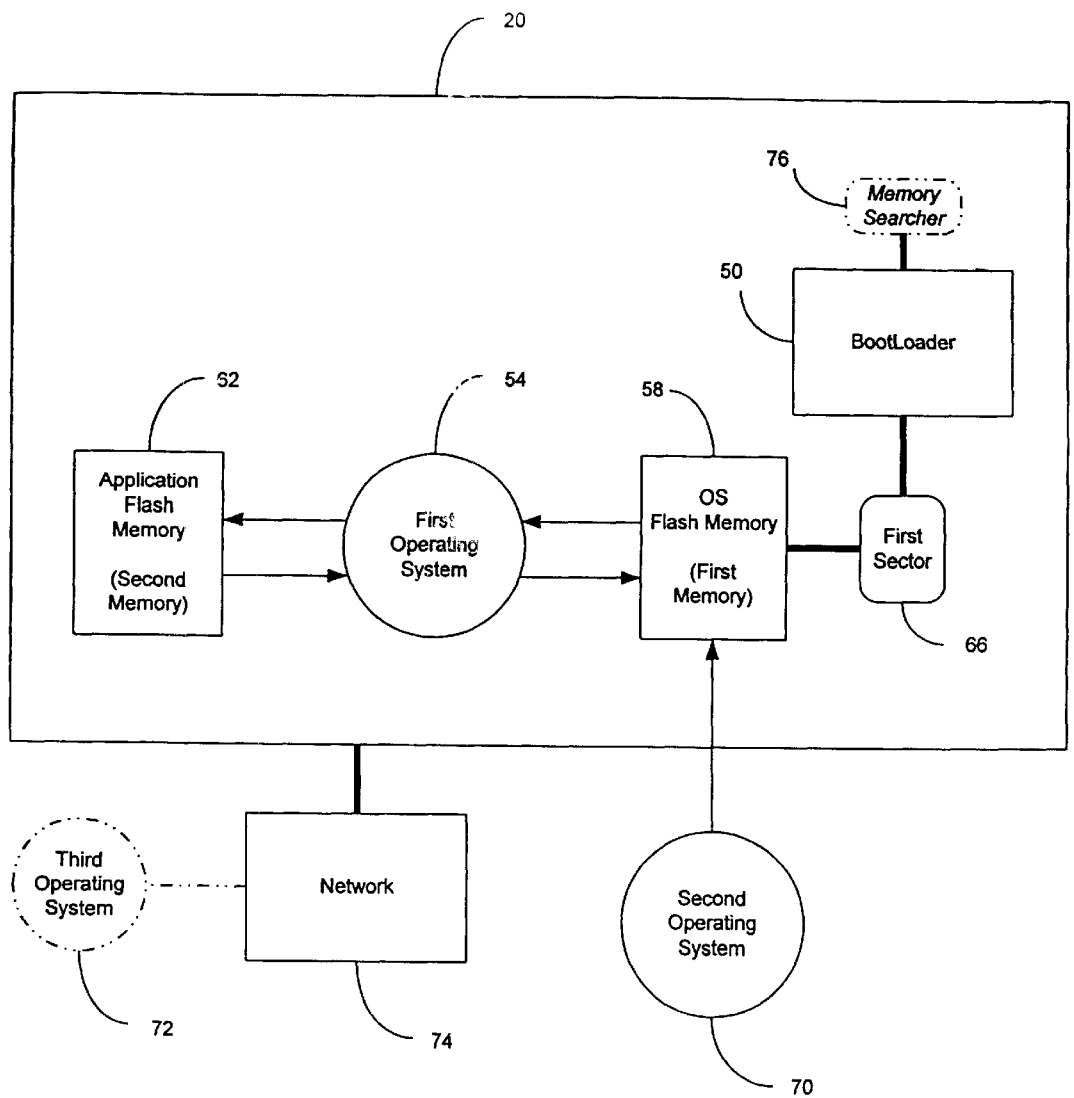
FIG. 3 is a block diagram depicting the components of the present invention for downloading and restoring operating systems.

FIG. 3 depicts the components and flow of data associated with the operation of bootloader program 50. Set-top box 20 includes a first operating system 54 that is loaded in operating system EEPROM memory 58. Set-top box 20 includes a second memory 62 for storage of an application program (i.e., application EEPROM memory 62).

Operating system EEPROM memory 58 includes a first sector 66 for storing the instruction code associated with bootloader 50. Preferably, first sector 66 is in a locked state so that overwriting of first sector 66 is prevented.

When a second operating system 70 is to be downloaded and utilized by set-box 20, bootloader 50 first forms a backup copy of first operating system 54 in application EEPROM memory 62. Second operating system 70 is then loaded into operating system EEPROM memory 58. If bootloader 50 detects any anomalies arising from the down load of second operating system 70 or anomaly associated with execution of second operating system 70 once downloaded, bootloader 50 transfers first operating system 54 from application EEPROM memory 62 to operating system EEPROM memory 58.

This restoration system provides robustness in the downloading and execution of new operating systems within set-top box 20. In an alternate embodiment of the present invention, bootloader 50 obtains another operating system 72 via network 74 in order to replace a malfunctioning second operating system 70. Bootloader program 50 is able to tune to the correct frequency in order to perform the download from the broadcast carousel or can perform the download via the TCP/IP network of the box or via the SCSI of the box or ethernet connection of the box or can obtain the URL (uniform resource locator) or via any data communication link that the box has.

In another embodiment of the present invention, the first operating system 54 may be stored in one or several EEPROM memory devices. In such embodiment, bootloader 50 includes a memory searcher 76 in order to located within which EEPROM memory device is first operating system stored. For example, first operating system 54 may be placed in an alternate boot EEPROM memory device located on a SCSI/Serial option board.

With such functionality, the present invention allows a recovery from failure during any stage of the loading of an operating system, for example, but not limited to: a failure loading an operating system from the first memory to second memory (e.g., due to a power failure); or a failure while loading the second operating system. Bootloader program 50 preferably includes a downloader and a condition detector (e.g., a failure detector) in order to perform one or more of its operations.

Figure 4A:
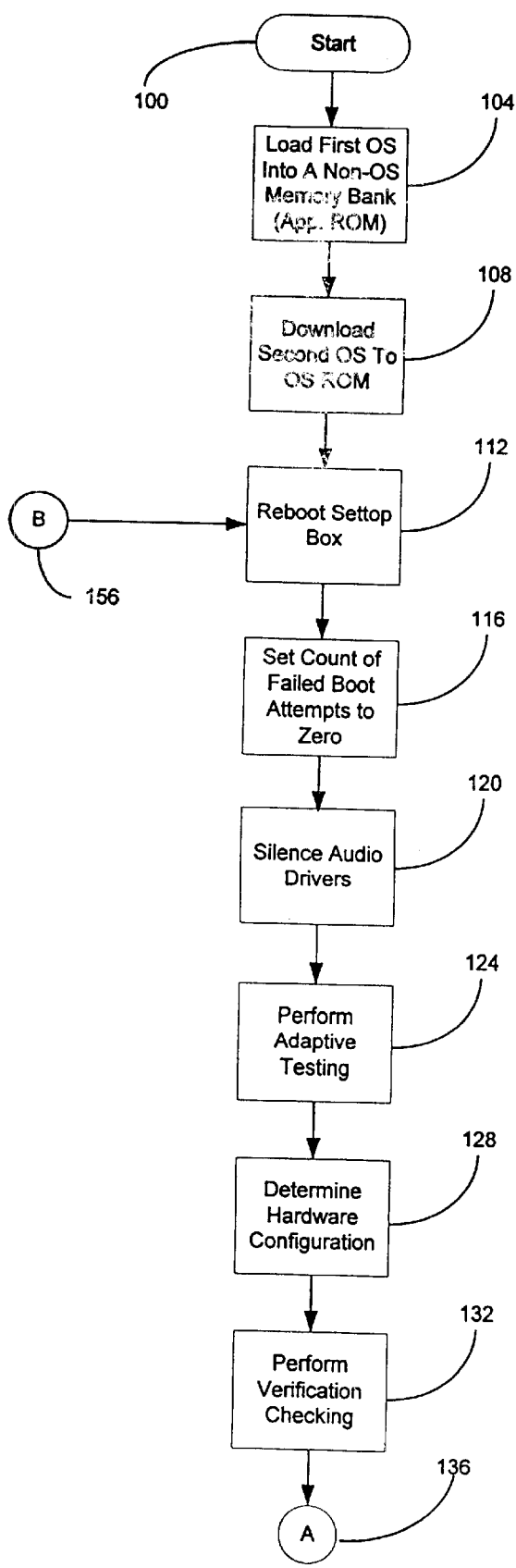
FIGS. 4a–4b are charts depicting the process steps for downloading and restoring operating systems for a set-top box system.
Figure 4B:
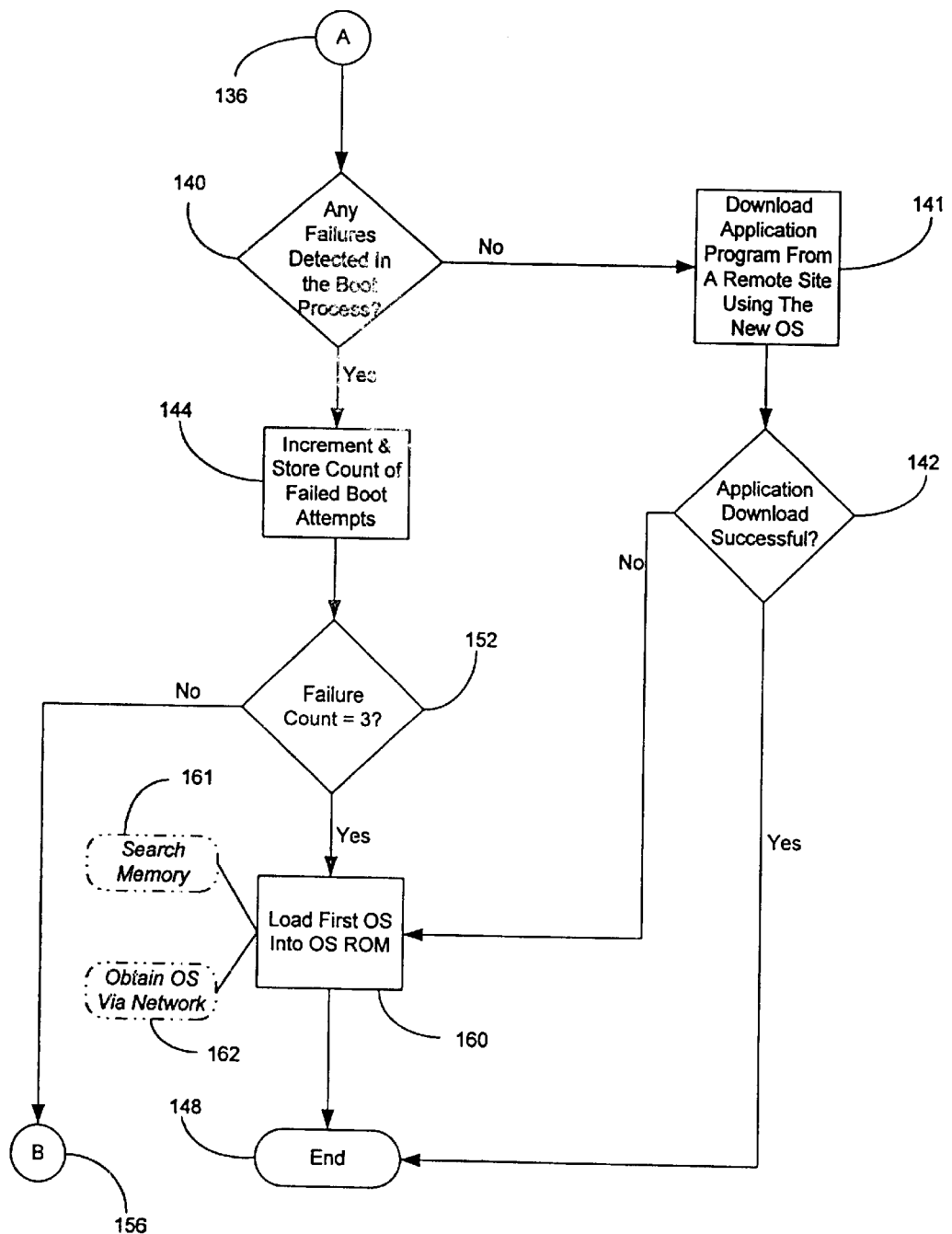

FIGS. 4a–4b depict detailed processing steps associated with downloading operating systems to set-top box 20. With reference to FIG. 4a, start indication block 100 indicates that process block 104 is to be executed. Process block 104 loads the first operating system into the application ROM (i.e., the application EEPROM memory device). Process block 108 then downloads the second operating system to the operating system EEPROM memory. The set-top box is rebooted at process block 112, and the number of failed boot attempts is set to zero at process block 116.

The bootloader silences the audio drivers in the preferred embodiment since certain types of set-top boxes upon reboot produce static noises from audio chips. This functionality is performed by process block 120.

Moreover, adaptive testing is performed with respect to the new operating system in order to determine the amount of Random Access Memory (RAM) the set-top box contains. This functionality is performed by process block 124. Process block 128 determines the hardware configuration of the set-top box to ensure that an operating system had not been mistakenly downloaded for a different variation of the hardware in the set-top box. Process block 132 uses the hardware configuration information produced by process block 128 in order to perform a verification check between the new operating system and the hardware configuration of the set-top box. Processing continues at continuation indicator 136.

With reference to FIG. 4b, continuation indicator 136 indicates that decision block 140 is to be processed. Decision block 140 inquires whether any failures were detected during the boot process. A failure may include that the new operating system was not able to boot up properly and could not, for example, perform one or more of the functions described on FIG. 4a, such as, but not limited to, determining the hardware configuration at process block 128.

If decision block 140 has not detected any failure during the boot process, then processing continues at process block 141. Process block 141 performs an additional test to determine whether the downloaded operating system is functioning properly. Process block 141 downloads an application program from a remote site using the new operating system. Decision block 142 checks whether the application was downloaded successfully. If the download was successful, then processing terminates at end block 148. If the application download was not successful, then process block 160 loads the first operating system in the operating system ROM before terminating at end block 148.

In an alternate embodiment wherein the first operating system may be stored in one or more memory banks, process block 160 performs a search of the possible memory banks via process block 161 in order to retrieve the first operating system. In yet another embodiment, process block 160 retrieves the operating system via the network via process block 162.

With reference back to decision block 140, if decision block 140 determines that a failure has occurred, then process block 144 is executed wherein a running count of the failed boot attempts is incremented and stored. Decision block 152 inquires whether the failure count is equal to three. If the failure count is less than three, then processing continues on FIG. 4a at continuation indicator 156.

If the failure count is equal to three, then process block 160 loads the first operating system into the operating system ROM from the application ROM. It should be understood that the present invention is not limited to a failure count of three before reloading the first operating system, but also includes not maintaining any failure count and reloading at the first instance of a failure of the second operating system. Moreover, the present invention includes the failure count being less than three or greater than three.

In an alternate embodiment wherein the first operating system may be stored in one or more different memory banks, process block 160 performs a search of the possible memory banks via process block 161 in order to retrieve the first operating system. In yet another embodiment, process block 160 retrieves the operating system via the network via process block 162. Processing for the bootloader then terminates at end block 148.

While the above detailed description describes the preferred embodiment of the present invention, the invention is susceptible to modification, variation, and alteration without deviating from the scope and fair meaning of the appended claims.

It is claimed:

1. A method for restoring operating systems within a set-top box system, comprising the steps of;
    operating a first operating system stored in a first memory from among a plurality of provided memories, said first operating system having been located by searching said plurality of memories for said first operating system in response to a detected predetermined condition associated with said second operating system;
    operating an application program in a second memory;
    storing said first operating system in said second memory;
    loading a second operating system in said first memory; and
    loading said located first operating system into said first memory from said second memory in response to said detected predetermined condition.

2. The method of claim 1 further comprising the step of:
    detecting a failure of said second operating system to boot after being loaded in said first memory;
    loading said first operating system into said first memory from said second memory in response to said detected predetermined condition.

3. The method of claim 1 further comprising the steps of:
    iteratively attempting to boot said set-top box system with said second operating system;
    determining the count of boot attempts associated with said second operating system; and loading said first operating system into said first memory in response to said determined count being greater than a predetermined threshold.

4. The method of claim 3 further comprising the step of:

providing a locked sector within said first memory for containing computer instructions for loading said first operating system into said first memory in response to said determined count being greater than said predetermined threshold.

5. The method of claim 1 further comprising the steps of:

providing a network for communicating with said set-top box system; and loading a third operating system into said first memory via said network in response to said detected predetermined condition.

6. The method of claim 1 further comprising the steps of:

providing a network for communicating with said set-top box system at a predetermined frequency;

tuning said set-top box system to said predetermined frequency; and loading a third operating system into said first memory via said network in response to said detected predetermined condition.

7. The method of claim 1 further comprising the steps of:

providing a network for communicating with said set-top box system at a predetermined frequency;

using said second operating system to download an application program via said network;

detecting a predetermined condition associated with said downloading of said application program;

loading said first operating system into said first memory in response to said detected predetermined condition.

8. The method of claim 1 further comprising the steps of:

detecting the predetermined condition of a failure during said step of storing said first operating system in said second memory; and loading said first operating system into said first memory from said second memory in response to said detected predetermined condition.

9. An apparatus for restoring operating systems within a set-top box system, comprising:

a first memory for operating a first operating system, said first memory being one memory from among a plurality of memories available for storing said first operating system;

means for storing said first operating system in one of said memories;

a second memory for operating an application program;

a downloader for storing said first operating system in said second memory and for downloading a second operating system into said first memory from a source external to said box;

means for locating said first operating system by searching said plurality of memories for said first operating system in response to a detected predetermined condition;

means for loading said located first operating system into said first memory in response to said detected predetermined condition; and a condition detector for detecting a predetermined condition associated with said second operating system;

said downloader loading said first operating system into said first memory from said second memory in response to said detected predetermined condition.

10. The apparatus of claim 9 further comprising:

a failure detector for detecting a failure of said second operating system to boot after being loaded in said first memory;

said downloader loading said first operating system into said first memory from said second memory in response to said detected predetermined condition.

11. The apparatus of claim 9 further comprising:

means for iteratively attempting to boot said set-top box system with said second operating system;

means for determining the count of boot attempts associated with said second operating system; and means for loading said first operating system into said first memory in response to said determined count being greater than a predetermined threshold.

12. The apparatus of claim 11 further comprising:

a locked sector within said first memory for containing computer instructions for loading said first operating system into said first memory in response to said determined count being greater than said predetermined threshold.

13. The apparatus of claim 9 further comprising:

a network for communicating with said set-top box system, said downloader loading a third operating system into said first memory via said network in response to said detected predetermined condition.

14. The apparatus of claim 9 further comprising:

a network for communicating with said set-top box system at a predetermined frequency;

a tuner for tuning said set-top box system to said predetermined frequency, said downloader loading a third operating system into said first memory via said network in response to said detected predetermined condition.

15. The apparatus of claim 9 further comprising:

a network for communicating with said set-top box system at a predetermined frequency;

means for using said second operating system to download an application program via said network;

means for detecting a predetermined condition associated with said downloading of said application program;

means for loading said first operating system into said first memory in response to said detected predetermined condition.

16. The apparatus of claim 9 further comprising:

means for detecting the predetermined condition of a failure during said step of storing said first operating system in said second memory; and means for loading said first operating system into said first memory from said second memory in response to said detected predetermined condition.

* * * * *

UNITED STATES PATENT AND TRADEMARK OFFICE
CERTIFICATE OF CORRECTION

PATENT NO. : 6,393,585 B1  
DATED : May 21, 2002  
INVENTOR(S) : Houha et al.

It is certified that error appears in the above-identified patent and that said Letters Patent is hereby corrected as shown below:

Column 1,
Line 48, delete "to" between "apparent" and "from"
Line 59, insert -- flow -- before "charts"

Column 2,
Line 27, delete "dowload" and insert therefore -- download --
Line 30, delete "downloaeded" and insert therefore -- downloaded --

Column 3,
Line 9, delete "located" and insert therefore -- locate --

Signed and Sealed this

Ninth Day of July, 2002

Attest:

JAMES E. ROGAN
Attesting Officer  Director of the United States Patent and Trademark Office